March 24, 1925.
G. J. BELKNAP
VALVE SPINDLE
Filed May 24, 1923
1,530,751
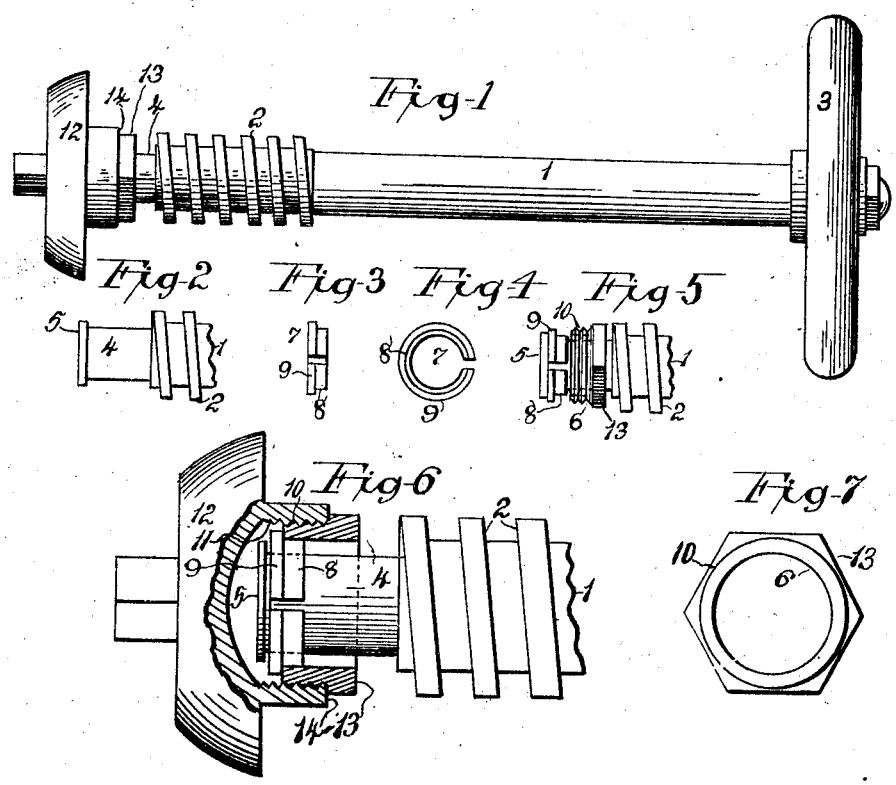
INVENTOR.
BY George J. Belknap.
Geo. D. Phillips ATTORNEY.

Patented Mar. 24, 1925.

1,530,751

UNITED STATES PATENT OFFICE.

GEORGE J. BELKNAP, OF BRIDGEPORT, CONNECTICUT.

VALVE SPINDLE.

Application filed May 24, 1923. Serial No. 641,048.

*To all whom it may concern:*

Be it known that I, GEORGE J. BELKNAP, a citizen of the United States, residing at Bridgeport, in the county of Fairfield and State of Connecticut, have invented certain new and useful Improvements in Valve Spindles; and I do hereby declare the following to be a full, clear, and exact description of the invention, such as will enable others skilled in the art to which it appertains to make and use the same.

My invention relates to valve spindles, and it consists in improved means of attaching the valve head to the spindle.

Referring to the accompanying drawings wherein similar characters of reference indicate corresponding parts throughout the several views—

Figure 1 represents a detail view of the improved spindle with a valve head mounted thereon;

Figure 2 is a broken view of the valve head end of the spindle;

Figure 3 is a side view of the split ring;

Figure 4 is an end view of the split ring;

Figure 5 is a broken view of the valve spindle with the split ring and lock nut mounted thereon;

Figure 6 is an enlarged broken view of the valve spindle and its equipment in operative position on the spindle, comprising the split ring and a broken view partly in section of the valve head, and sectional view of the lock nut.

Figure 7 is an enlarged end view of the lock nut.

The usual valve spindle construction consists of the body 1, enlarged threaded part 2 and the wheel handle 3. One feature of the improved spindle consists in reducing the inner or valve head end of the spindle below the diameter of the threaded portion 2 to form the journal 4 and its flange 5.

In assembling the several elements comprising the lock nut 6 and split resilient ring 7, the lock nut, whose internal diameter is a trifle larger than the flange 5, is passed over said flange as shown in Figures 5 and 6. The split ring 7 is next sprung over the flange 5 and its body portion 8 is forced into the lock nut as shown in Figure 6. The flange 9 of the ring simply locates the ring at the inner end of the mouth of the lock nut. The internal diameter of the split ring being smaller than the diameter of the flange 5 of the spindle, the ring and lock nut, when united, cannot be accidentally unseated.

When the lock nut and split ring are thus initially placed, the threaded portion 10, Figure 6, of the nut is screwed into the threaded mouth 11 of the valve head 12, with its hexagon flange 13 firmly against the end 14 of the valve head. When the lock nut, valve head and split ring are thus assembled, they will have a certain free longitudinal play on the valve spindle, and also sufficient tilting movement, due to the free play of the split ring on the valve spindle, to properly seat the valve head on the seat, not shown. The floating split ring centralizes the lock nut and valve head with the valve spindle, and the valve head with its seat.

Having thus described my invention what I claim is:—

1. A valve spindle having an enlarged threaded portion on the body thereof, the inner end of the spindle having a flange of smaller diameter than said threaded portion, a split resilient ring freely embracing the spindle, a lock nut forcibly mounted on the ring to compress said ring so that its interior surface is brought within the outer surface of the spindle flange, said ring having a flange abutting the end of the lock nut, and a threaded valve head mounted on the lock nut.

2. A valve spindle having an enlarged threaded portion on the body thereof, the inner end of the spindle having a flange of smaller diameter than said threaded portion, a lock nut surrounding the spindle and having a bore adapted to pass freely over the flange, a split resilient ring having a bore smaller than said flange, said ring forcibly engaging the bore of the lock nut and having a flange abutting the inner end of the nut, and a threaded valve head mounted on the lock nut.

In testimony whereof I affix my signature.

GEORGE J. BELKNAP.